Feb. 20, 1934.    J. BOCA    1,948,283
COWL VENTILATOR DOOR
Filed Oct. 7, 1932    2 Sheets-Sheet 1

Inventor
Joseph Boca
By Blackmore, Spencer & Flint
Attorneys

Patented Feb. 20, 1934

1,948,283

UNITED STATES PATENT OFFICE 1,948,283

COWL VENTILATOR DOOR

Joseph Boca, Flint, Mich., assignor to General Motors Corporation, Detroit, Mich., a corporation of Delaware Application October 7, 1932. Serial No. 636,702

7 Claims. (Cl. 98—2)

This invention relates to cowl ventilators used on automotive vehicles.

A particular object of the invention is to provide a cowl ventilator which is capable of affording both direct and indirect ventilation.

The cowl ventilator of the invention has the door or closure of the ventilator opening movable inwardly of the cowl so that when the ventilator is open no part will project above the cowl. An air channel is provided below the door and ventilator opening and a drain at the bottom of the channel will catch and divert away from the vehicle water or snow falling through the opening. When the weather is clear a shield used to divert the rain, is moved out of the path of the air stream to allow the air to enter directly into the vehicle or to give direct ventilation. The door and shield are operable by a handle positioned at the inside of the vehicle within reach of the driver.

Figure 1:
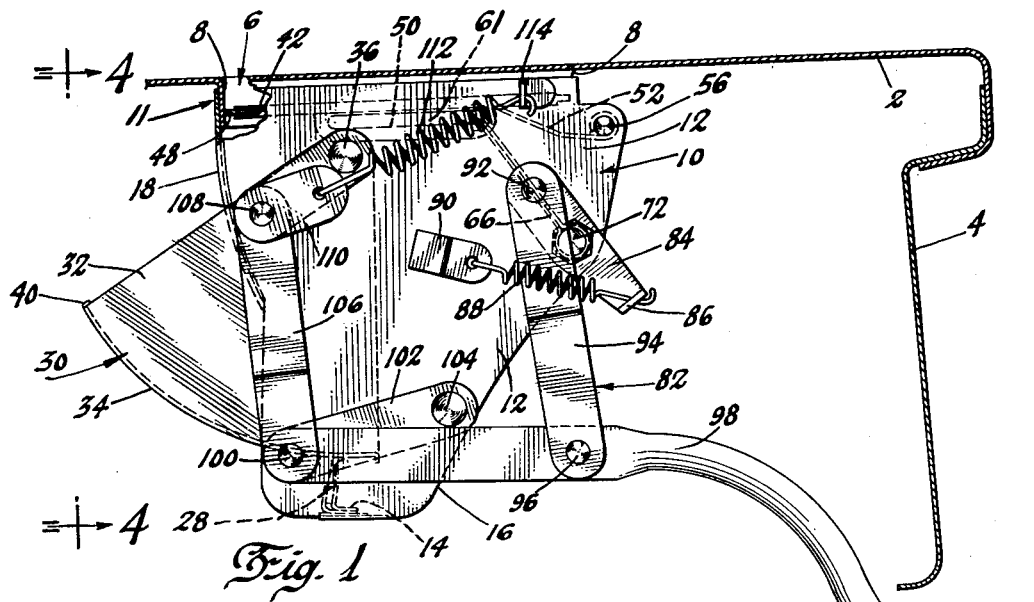
Figure 1 is a transverse section through the cowl of an automotive vehicle on the line 1—1 of Figure 4 showing the ventilator door closed. Parts are shown in section clearer to illustrate the invention.

Referring to the drawings, the numeral 2 indicates the cowl of an automotive vehicle having the instrument board 4 secured thereto. The cowl is provided with two top openings 6, one at each side, the edges of the openings being formed by the downturned flanges 8 formed from the metal of the cowl 2. The structure at both openings is the same.

A housing or channel 10 is mounted beneath the opening 6 and is secured to the flange 8. The parts may be welded together at 11 or secured by rivets. The housing 10 includes the end members 12, the bottom 14, the rear side 16 and the forward side 18. The forward side 18 extends only part way to the bottom 14, leaving an opening at 20 for the air to enter beneath the cowl. The end members 12 have the flanges 22 which underlap and are secured to the bottom 14 to make a rigid structure. The front member 18 is also provided with end flanges 24 which are spaced from the ends 12 and which extend inwardly of the housing 10 to form a rigid structure.

The bottom member 14 has secured thereto the two angle brackets 26 which project outwardly away from the bottom in spaced relaton and have secured therebetween the felt or other fabric strip 28. The angle members 26 and the bottom part of the housing form a water trough 29.

A shield or guard 30 having triangular side wings 32 and the rounded bottom 34 is pivoted at 36 to the end members 12 of the housing 10. The wings of the guard are pivoted to swing between the flanges 24 of the front side piece 18 and the ends 12 of the housing 10. The lowermost portion of the rounded bottom 34 has the downwardly turned flange 38, while the uppermost portion has the upwardly turned flange 40. The rounded bottom 34 is shaped to conform so that it contacts with the edge of the strip 28 as it swings from the position of Figures 1 and 2 to that of Figure 3.

The door for the vent opening is shown at 42 and comprises the top plate 44 and the edge reinforcing members 46. The edge members 46 are spaced from the top plate 44 and between the plate and reinforcing members there is secured a strip 48 of felt or other suitable fabric to make a rain-proof connection or joint with the flange 8 when the cover is in its closed position as shown in Figure 1.

The door also has secured thereto the two angle members 50, one at each side of each door. The horizontal portion (Figure 1) of each angle member 50 has an arm 52 which extends rearwardly and has its end formed into an eye 54 secured by a pin 47 to a shaft 56 mounted in ears 60 secured to the rear side 16 of the housing 10. The arms 52 and shaft 56 form a pivot mounting for the cover 42. The vertical arm of each angle member 50 is provided with a slot 61 in which there slides the ends of the rods or bolts 62. A U-shaped link 66 has the legs of the U formed into eyes 68 which surround the bolts 62 secured in place by means of the cotter pins 64. The link 66 is formed of a piece of metal folded upon itself and at the base of the U the link is formed into an eye or cylinder 70 which surrounds a shaft 72 rotatably held at its ends by means of the eyes 74 in brackets 76 secured to the side 16. Suitable springs 78 prevent rattle of the parts. Pins 80 pass through the eye 70 and through the shaft 72 rigidly to hold the eye on the shaft.

At one end of the cowl ventilator there is provided a suitable linkage mechanism 82 to operate the door 42 and the shield 30. The linkage comprises the arm 84 rigidly secured to the shaft 72 which projects beyond the side 12. The arm 84 has its end bent at an angle, as shown at 86, and the coil spring 88 extends between the angle and a bracket 90 secured to the side 12. The spring 88 holds the parts in closed position in Figure 1 and in open position in Figures 2 and 3. To the other end of the arm 84 there is pivoted at 92 a link 94, the lower end of which is pivoted at 96 to an operating lever 98, the free end of which has a pivot at 100 to connect it to a link 102 pivoted at 104 to the side 12 of the housing 10. On the pivot 100 there is pivoted a link 106, the other end of which is pivoted at 108 to the upper portion of the wing 32 of the shield 30. The pivot 108 has rigidly secured thereto the arm 110 which has a coil spring 112 hooked in the end thereof, the other end being secured to a bracket 114 secured to the side 12 of the housing 10. The spring 112 holds the shield 30 in the upper position when the parts are as shown in Figure 3. When the parts move from the position of Figure 1 to that of Figure 3, the spring 112 moves across the axis of the pivot 36. The parts are originally in the position shown in Figure 1. In this position, the ventilator door 42 is closed and prevents the entrance of any air or rain into the vehicle. When the operator desires ventilation, he presses downwardly on the knob 115 of the operating lever 98 which movement will swing the parts from the position of Figure 1 to the position of Figure 2. The air will now enter the channel 10, as indicated by the arrows in Figure 2, and strike the bottom 34 of the shield 30 and enter the vehicle at A to give indirect ventilation. The parts are left in this position in case it is raining, the drops of water being indicated in Figure 2. The rain will be shed by the cover 42 and the bottom 34 of the shield and trapped as indicated at B and caused to flow to the bottom 14. The side of the housing 10 at the bottom is provided with a pipe 116 which conducts the water away from the cowl to a point below the vehicle. In pulling the lever from the position of Figure 1 to the position of Figure 2, the link 94 will swing the arm 84 to rotate the shaft 72, which will swing the U-shaped link 66 and cause the rods 62 in the end thereof to ride outwardly in the slot 61 and pull the cover 42 downwardly on its pivot at 56. The spring 88 will swing with the end 86 of the arm 84 and will move across the axis of the shaft 72, to hold the parts in the position of Figure 2. This initial movement of the arm 98 will be insufficient to disturb the links 106 and 102. If direct ventilation is required a further and harder downward pressure on the operating handle 98 will move the pivot 100 upward around the pivot 104 to cause link 106 to swing the shield 30 from the position of Figure 2 to the position of Figure 3. This upward movement will swing the pivot 108 above the pivot 36 and move the spring 112 across the axis of the pivot to cause the spring to hold the shield 32 in the position shown in Figure 3. This position of the parts is used where there is no rain or snow falling and there is no likelihood of moisture entering the vehicle. The air is now allowed to travel directly to the vehicle, as indicated by the arrows in Figure 3, or to give direct ventilation.

Figure 2:
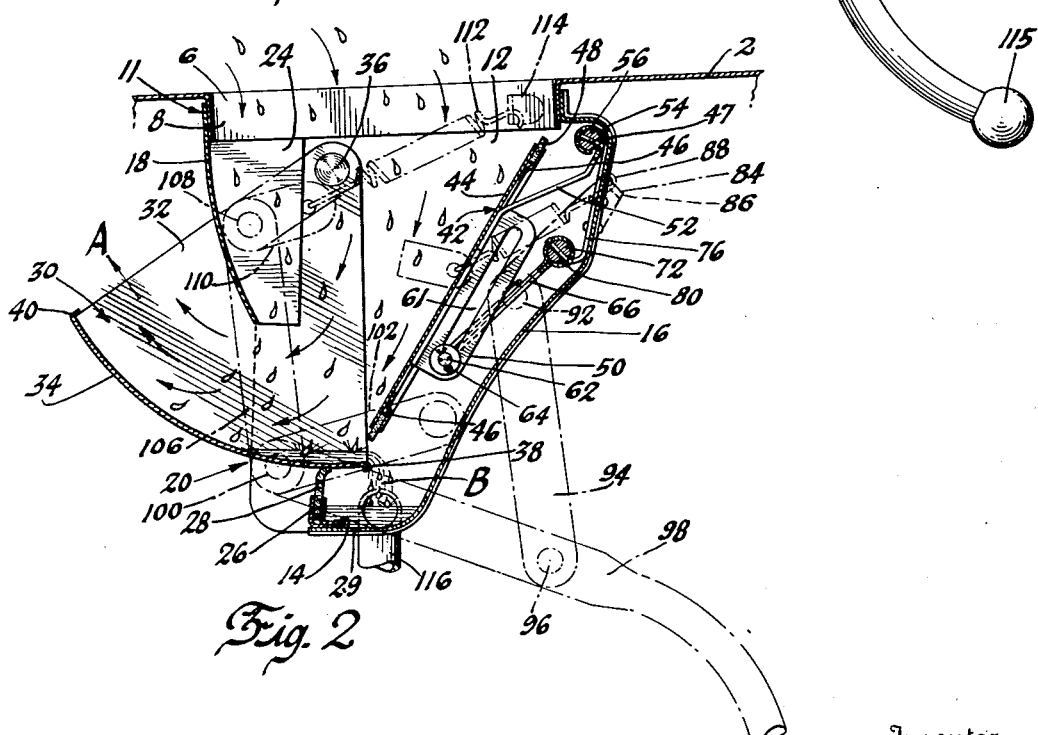
Figure 2 is a sectional view similar to Figure 1 but with the ventilator door lowered and the shield in position to shed rain and to give indirect ventilation.
Figure 3:
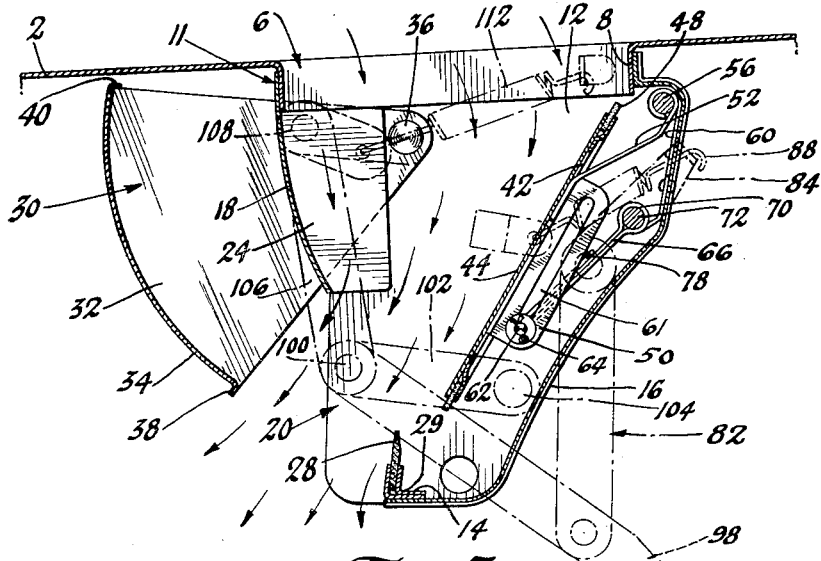
Figure 3 is a view similar to Figure 2 but with the shield raised to give direct ventilation.
Figure 4:
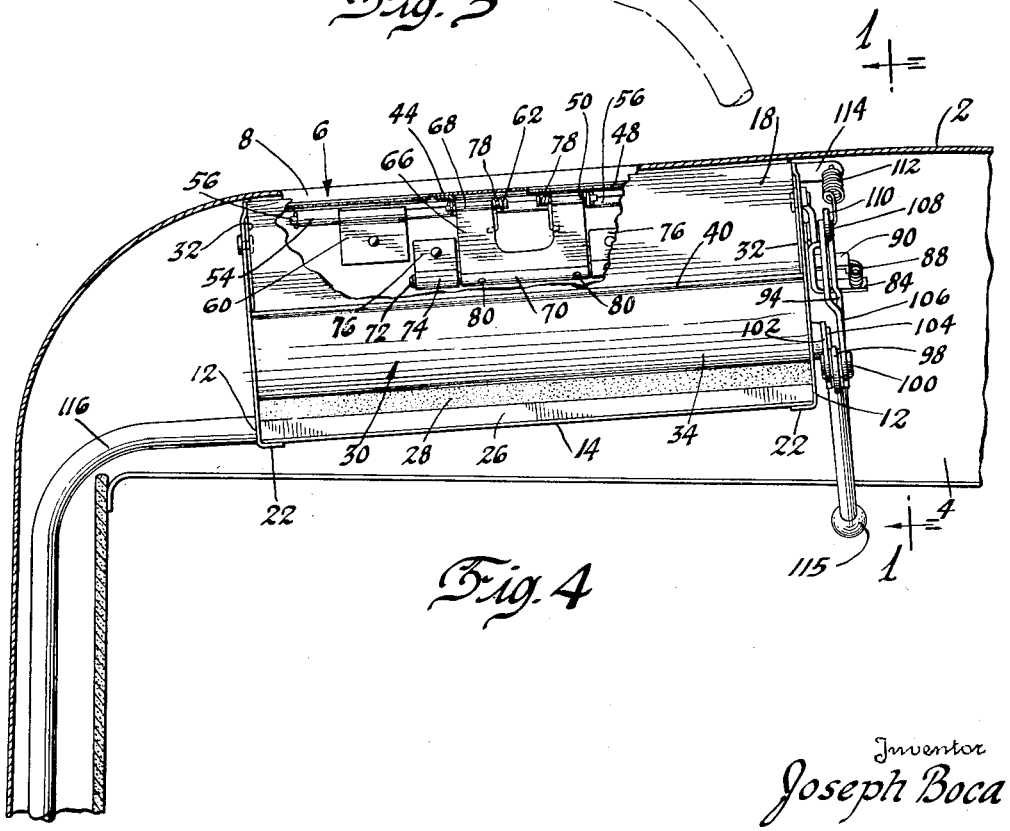
Figure 4 is a view in elevation on the line 4—4 of Figure 1.

The reverse or upward movement of the handle 98 will swing the shield 30 downward from its position in Figure 3 to its position in Figures 1 and 2 and also swing the door 42 from its position in Figures 2 and 3 to its position in Figures 1 and 4.

I claim:

1. In a ventilator having an opening, a door for closing the ventilator opening, means for opening and closing the door, means for directing the flow of air entering the opening, said means including a movable member capable of allowing a direct flow of air from the opening through the said means or to divert the air out of the path of direct flow, and single means for operating both said means.

2. In a ventilator having an opening, a door for closing the ventilator opening, means for directing the flow of air entering the opening, said means including a movable member capable of allowing a direct flow of air from the opening through the said means or to divert the air out of its path of direct flow, and means at the bottom of the said air-directing means to catch and drain away water.

3. In a ventilator for application to an automotive vehicle, said ventilator having an opening, a door for the ventilator movable into the vehicle to uncover the ventilator opening, a water trough in the vehicle below the ventilator to catch water and divert it outside the vehicle, and adjustable means below the ventilator opening to change the direction of flow of the air entering the ventilator.

4. In a ventilator for application to an automotive vehicle, said ventilator having an opening, a ventilator door movable inside the vehicle to open or close the ventilator opening, an air channel below the door and into which the door moves when moving to open position, a linkage pivoted to the channel and to the door to move the door, and a handle for operating the linkage.

5. In a ventilator for application to an automotive vehicle, said ventilator having an opening, a ventilator door movable inside the vehicle to open or close the ventilator opening, an air channel below the door and into which the door moves when moving to open position, a linkage pivoted to the channel and to the door to move the door, a handle for operating the linkage, a rain shield movably secured to said channel, and means for moving the rain shield to a position to shed water or to a position to allow unrestricted flow of air when the door is open.

6. In a ventilator for automotive vehicles, said ventilator having an opening, an air channel inside the vehicle below the opening, a door movable into said channel to open the ventilator opening, means hinging said door to the channel, a linkage mounted on the channel and connected to the door, means for operating said linkage to open or close the door, a rain shield pivoted to the channel, a link for operating said shield and interconnected with the operating means for said linkage, said operating means operating said link after the said linkage has moved to open the door.

7. In a ventilator for automotive vehicles having a ventilator opening, an air channel inside the vehicle below the opening, a door movable into said channel to open the ventilator opening, means hinging said door to the channel, a linkage mounted on the channel and connected to the door, means for operating said linkage to open and close the door, a rain shield pivoted to the channel and movable into or out of the path of the air entering through the channel, a link for operating said shield and interconnected with the operating means for said linkage, said operating means operating said link after said linkage has moved to open the door.

JOSEPH BOCA.